United States Patent [19]

Weitemeyer et al.

[11] Patent Number: 4,906,721
[45] Date of Patent: Mar. 6, 1990

[54] ORGANOPOLYSILOXANES AND CURABLE ORGANOPOLYSILOXANE PREPARATION CONTAINING THEM

[75] Inventors: Christian Weitemeyer; Goetz Koerner, both of Essen, Fed. Rep. of Germany

[73] Assignee: Th. Goldschmidt AG, Essen, Fed. Rep. of Germany

[21] Appl. No.: 183,937

[22] Filed: Apr. 20, 1988

Related U.S. Application Data

[63] Continuation-in-part of Ser. No. 79,716, Jul. 30, 1987, abandoned, which is a continuation-in-part of Ser. No. 907,844, Sep. 16, 1986, abandoned.

[30] Foreign Application Priority Data

Sep. 19, 1985 [DE] Fed. Rep. of Germany ....... 3533350

[51] Int. Cl.$^4$ .............................................. C08G 77/04
[52] U.S. Cl. ........................................ 528/29; 528/31; 556/457; 556/462; 556/471
[58] Field of Search .................... 528/29, 31; 556/457, 556/462, 471; 525/474

[56] References Cited

U.S. PATENT DOCUMENTS 4,431,789 2/1984 Okazaki et al. .................... 528/15
4,452,962 6/1964 Ginnings et al. .................... 528/26

Primary Examiner—Melvin I. Marquis
Attorney, Agent, or Firm—Toren, McGeady & Associates

[57] ABSTRACT

Novel organopolysiloxanes are disclosed which comprise

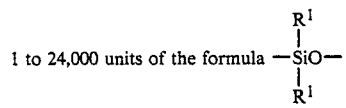

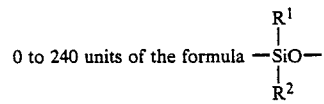

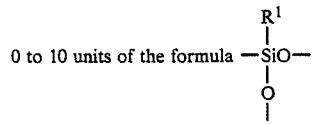

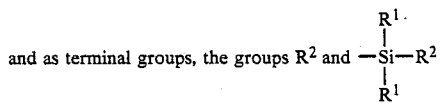

wherein
$R^1$ is methyl or phenyl, with the proviso that at least 90% of $R^1$ is methyl; and
$R^2$ is
 (a) $R^1$,
 (b) linear or branched alkinoxy with 3 to 25 carbon atoms, or
 (c) a polyalcohol with 2 to 6 hydroxyl groups from which the H-atom of the OH-groups is eliminated, with all but one of the OH-groups being etherified with allyl alcohol.

The siloxanes must meet the conditions that at least one —C≡C— group is contained in the average molecule and that the numerical ratio of the —C≡C— group to the allyl ether groups is 5:1 to 1:250.

The novel organopolysiloxanes, mixed with hydrogenpolysiloxanes and a catalyst, are stable at room temperatures and cure rapidly at elevated temperatures. The cured mixtures have adhesive properties and exhibit no malfunctions due to migration of portions not linked chemically. A process for preparing the organopolysiloxanes is also disclosed.

11 Claims, No Drawings

ORGANOPOLYSILOXANES AND CURABLE ORGANOPOLYSILOXANE PREPARATION CONTAINING THEM

CROSS REFERENCE TO RELATED APPLICATIONS

This is a continuation-in-part of application Ser. No. 079,716 filed Jul. 30, 1987, now abandoned, which is a continuation-in-part of application Ser. No. 907,844 filed Sept. 16, 1986, now abandoned.

FIELD OF THE INVENTION

This invention relates to organopolysiloxanes containing acetylenically unsaturated groups and a process for their preparation. Considered from another aspect, the invention is directed to abhesive coating compositions.

BACKGROUND INFORMATION AND PRIOR ART

For the preparation of abhesive coating compositions, it is known that organosilicon compounds which have olefinically unsaturated groups may be reacted in the presence of platinum catalysts with organosilicon compounds which have SiH groups. For example, German Patent No. 29 18 254 describes such a process in which, as organosilicon compounds having olefinically unsaturated groups, those compounds are used which contain at least one group of the formula

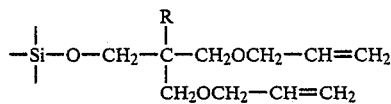

in which R represents methyl, ethyl or —CH$_2$OCH$_2$—CH=CH$_2$ in the average molecule.

Preparations which contain such organosilicon compounds with olefinically unsaturated groups and organosilicon compounds with SiH groups in addition to platinum catalysts do not have an indefinite shelf life.

From German Offenlegungsschrift 27 03 605, a curable organopolysiloxane preparation of increased shelf life is known which comprises an organopolysiloxane with at least two vinyl groups linked directly to the silicon atoms of a molecule, an organohydrogenpolysiloxane with at least two hydrogen atoms linked directly to the silicon atoms of a molecule and a platinum catalyst, wherein (a) the organopolysiloxane has the following average unit formula

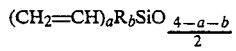

in which R represents the same or a different univalent hydrocarbon group without an aliphatically unsaturated radical, "a" has a value of 0.00025 to 0.5 and "b" a value of 0.75 to 2, with the proviso that the sum of "a" and "b" is 1.25 to 2.25, (b) the organohydrogenpolysiloxane which has no aliphatically unsaturated radicals is provided in such amounts that 0.5 to 4 hydrogen atoms which are linked directly to silicon atoms are provided per vinyl group in component (a) and that the composition (c) has an alkinyloxy group-containing organopolysiloxane which, in one molecule, has at least one univalent hydrocarbon group with a C≡C bond which is linked over an oxygen/silicon bond to the silicon atom.

The essential characteristic feature of this German Offenlegungsschrift 27 03 605 thus consists therein that, due to the presence of an alkinyloxy group, the premature curing of the preparation is avoided, the rapid curing of the preparation at elevated temperatures not being affected.

However, it has proven to be disadvantageous that the alkinyloxy groups containing organopolysiloxanes either are incompletely bonded into the polymer formed on curing or that, in the case of their addition, compounds with allyloxy groups may be formed which are relatively unstable hydrolytically.

The organopolysiloxanes with alkinyloxy groups which are not incorporated in the polymer structure, as well as compounds set free by hydrolysis, migrate to the surface of the coating and impair the suitability of these cured coatings as abhesive coatings.

OBJECTS AND SUMMARY OF THE INVENTION

It is a primary object of the present invention to provide organopolysiloxane preparations based on organosilicon compounds with olefinically unsaturated groups and organosilicon compounds with SiH groups which react with each other in the presence of catalysts and have a long shelf life in the presence of catalysts, yet can be cured rapidly at elevated temperatures, but do not exhibit the disadvantages of the known preparations, especially not the disadvantages arising out of the migration of unbonded components to the surface of the cured coating.

Surprisingly, it has been found that this objective can be accomplished if, as organosilicon compounds having olefinically unsaturated groups, those compounds are used which, additionally, have acetylenically unsaturated groups in the same molecule.

Therefore, the invention provides novel organopolysiloxanes which, in the average molecule and in statistical distribution, comprise

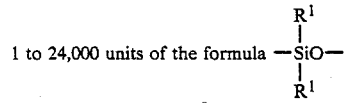

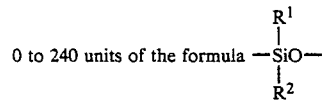

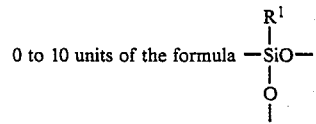

and as terminal groups, the groups R$^2$ and —Si—R$^2$ with R$^1$ and R$^1$ wherein R$^1$ is a member selected from the group consisting of methyl and phenyl with the proviso that at least 90% of R$^1$ is methyl; and $R^2$ is a member selected from the group consisting of:
(a) $R^1$,
(b) linear or branched alkinoxy with 3 to 25 carbon atoms, and
(c) a polyalcohol with 2 to 6 hydroxyl groups from which the H-atom of the OH-groups is eliminated with all but one of the OH-groups being etherified with allyl alcohol, with the proviso that at least one —C≡C— group is contained in the average molecule and that the numerical ratio of the —C≡C— group to the allyl ether groups is 5:1 to 1:250.

$R^2$ may thus be methyl or phenyl in the same manner of $R^1$. However, $R^2$ may also be a reactive residue whose reactivity emanates from a —C≡C— group (definition (b) above or from an allyl group (definition (c) above).

Conforming to definition (b), $R^2$ is alkinoxy. An alkinoxy residue is formed by splitting off a hydrogen atom from the hydroxyl group of an alkinol, i.e., an alcohol which is threefold unsaturated. Examples of particularly preferred alkinoxy groups $R^2$ are

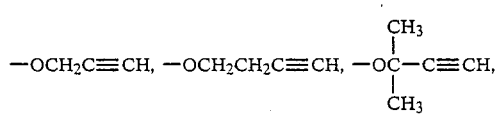

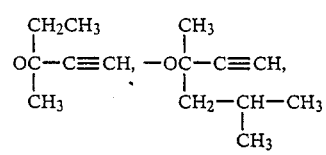

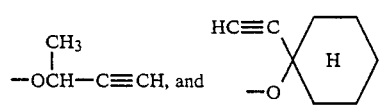

Conforming to definition (c), $R^2$ is a polyalcohol with 2 to 6 hydroxyl groups from which the hydrogen atom of the hydroxyl groups has been eliminated. All but one of the hydroxyl groups are etherified with allyl alcohol. If, for example, glycerine is used as polyalcohol, then $R^2$ has the formula

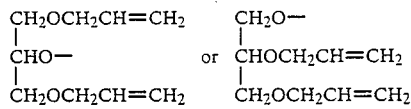

Examples of particularly preferred $R^2$ groups are

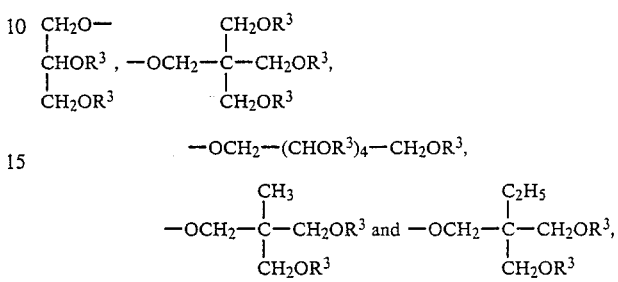

$R^3$ being an allyl group.

An essential condition for the invention is that the average molecule contains at least one —C≡C— group and that the numerical ratio of the —C≡C— group to the allylether groups is 5:1 to 1:250.

To express the invention more specifically and in detail, it is an aspect of the invention to provide novel organopolysiloxanes of the general average formula

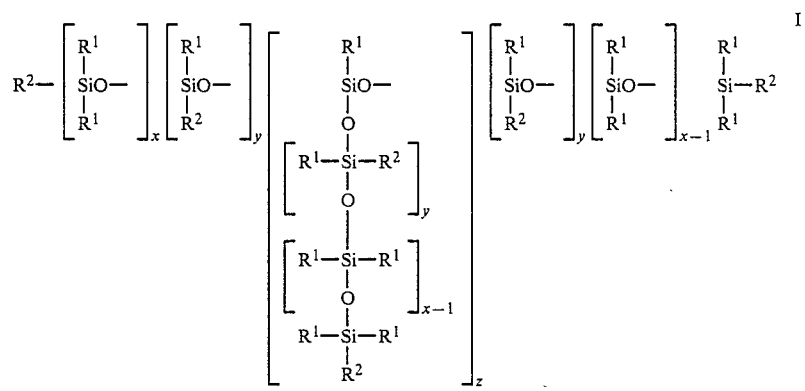

I wherein
$R^1$ and $R^2$ have the above meaning;
x=1 to 2000;
y=0 to 20, and
z=0 to 10.

Of course, the condition has to be met that at least one —C≡C— group is contained in the average molecule and that the numerical ratio of the —C≡C— group to the allylether groups is 5:1 to 1:250.

x preferably has a value of from 1 to 1000; particularly preferred is an x value of from 1 to 100.

The value of y is preferably from 0 to 10. A particularly preferred value for y is from 2 to 8.

z preferably has a value of from 0 to 6. A particularly preferred z value is from 2 to 6.

If z≧3, then it is preferred that x=1 to 500 and particularly 2 to 80.

Examples of suitable organopolysiloxanes of formula I are

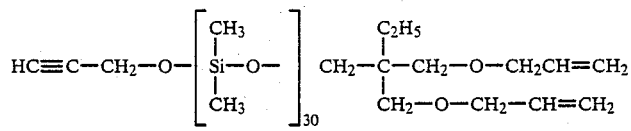
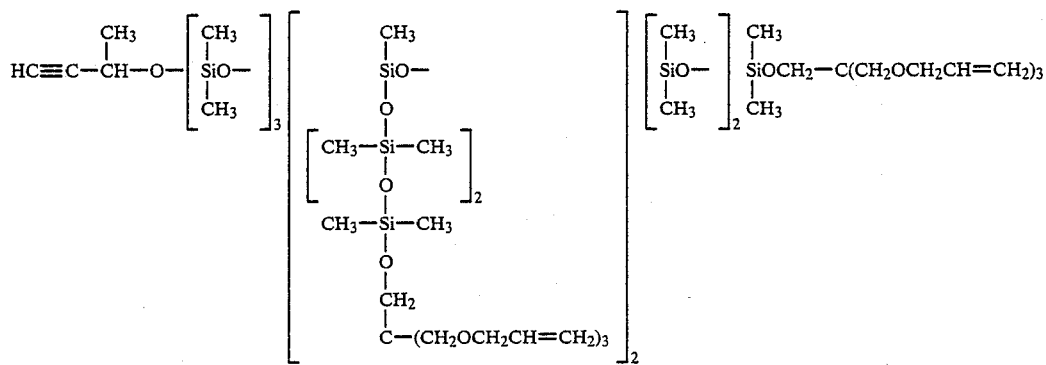
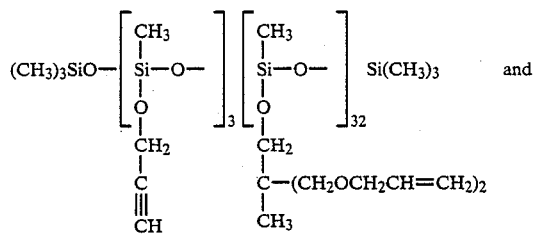
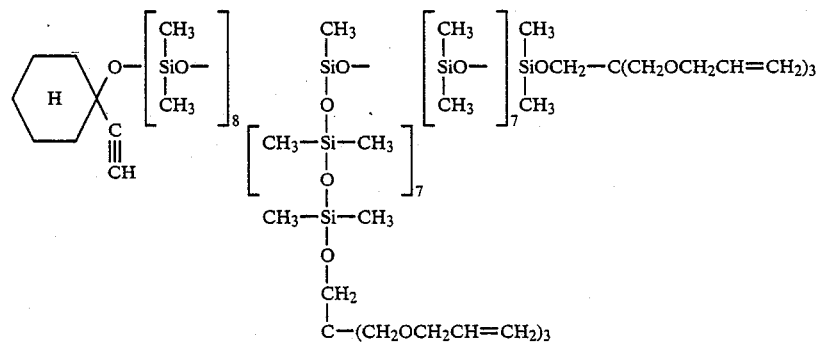
Pursuant to a further aspect of the invention, the novel organopolysiloxanes can be synthesized in a simple manner by reacting an organopolysiloxane of the general average formula
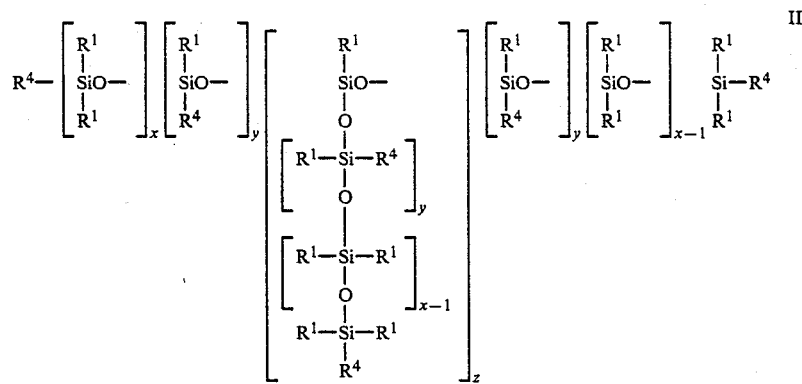
wherein
$R^1$, x, y and z have the above meaning and
$R^4$ is a member selected from the group consisting of
(a) $R^1$,
(b) alkoxy with 1 to 4 carbon atoms,
(c) halogen, and (d) hydrogen, with a mixture of an alkinol with 3 to 25 carbon atoms and a polyalcohol with 2 to 6 hydroxyl groups, all but one of the hydroxyl groups being etherified with allyl alcohol, with the proviso that the mixture contains an amount of (b), (c) and (d) groups and an amount of alcohol mixture is reacted that the average molecule comprises at least one —C≡C— group and the numerical ratio of the —C≡C— group to the allylether groups is 5:1 to 1:250.

The reaction advantageously takes place at an elevated temperature, preferably at 70° to 150° C.

Methoxy, ethoxy and chlorine are preferred as $R^4$ groups.

The invention furthermore encompasses curable organopolysiloxane preparations which have the essential characteristic feature that, besides organopolysiloxanes with SiH groups, they contain organopolysiloxanes of the general formula I as well as catalysts. The inventive organopolysiloxane preparations are, therefore, characterized by the fact that they comprise (a) 29.9 to 98,9999 weight percent of content of olefinic double bonds on the one hand and of SiH groups on the other. The ratio of groups with olefinic double bonds to SiH groups should be about 0.6 to 2.5:1.

A portion of component (a) may be replaced by equal amounts of a siloxane which is analogous in structure to the organopolysiloxanes of the general formula I, but is devoid of alkinoxy groups.

A further aspect of the invention is therefore a preparation of the above disclosed kind in which up to 80 percent by weight of component (a) is replaced by the same amount by weight of an organopolysiloxane of the general average formula

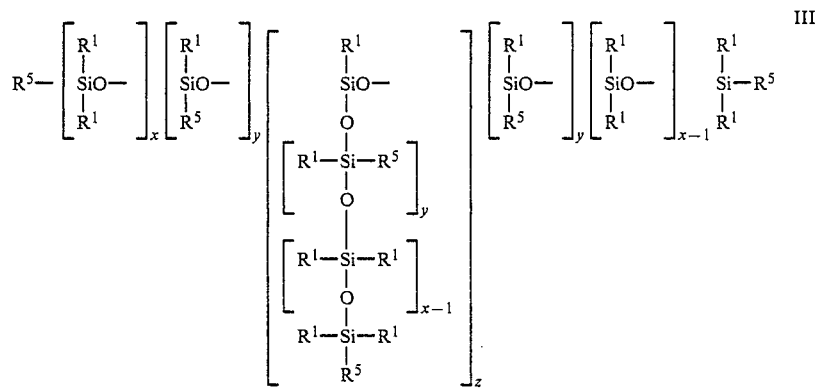

wherein $R^1$, x, y and z have the above meaning and $R^5$ is a polyalcohol with 2 to 6 hydroxyl groups from which the H-atom of the OH-groups is eliminated with all but one of the OH-groups being etherified with allyl alcohol.

In the event that organopolysiloxanes of the general formula III are added to the inventive preparation, it is advisable to use those siloxanes of formula I, for which the numerical ratio of the acetylenic hydrocarbon

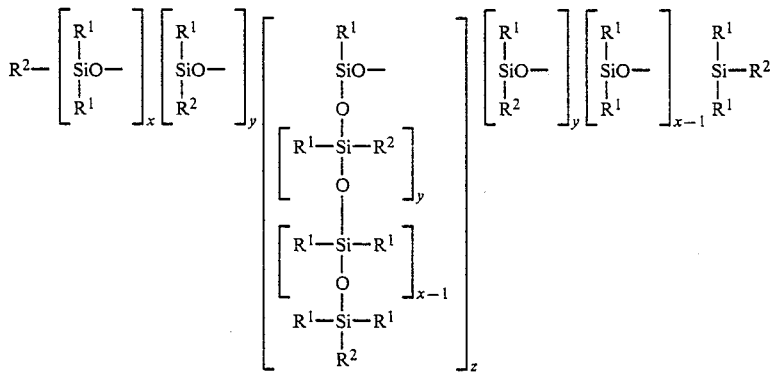

wherein
$R^1$, $R^2$, x, y and z have the above meaning, (b) 1 to 70 weight percent of an organopolysiloxane which, in the average molecule has at least 2≡SiH groups, and (c) 0.0001 to 0.1 weight percent of a catalyst, for the addition reaction of SiH groups to carbon-carbon multiple bonds.

The amount of compounds of the general formula I and of organopolysiloxanes with SiH groups, contained in the inventive organopolysiloxane preparation, may vary within wide limits. The ratio of these two components to each other is determined essentially by their groups to the allyl groups is shifted within the claimed region to higher values, such as 2:1 to 5:1.

The inventive, curable organopolysiloxane preparations are thus advantageous in several ways. The acetylenic hydrocarbon groups are a component of the organopolysiloxane which comprises the allyl groups. They are therefore incorporated into the structure of the cured polymer and cannot bleed out of the cured layer. Even if the olefinic bonds formed during the addition reaction of the acetylenic hydrocarbon groups to SiH would lead to a hydrolysis reaction, the polysiloxanes would remain bound in the polymer structure.

It follows that the abhesive properties of the cured coatings are retained unchanged.

The curable preparations are therefore especially suitable for producing abhesive coating compositions for two-dimensional carriers, particularly for paper and plastic films. They are furthermore suitable as sealing compositions for filling up electronic components and for producing elastic and rigid molded articles.

The curable organopolysiloxane preparations may also, in addition, contain a filler, pigment, plasticizer, solvent or an antioxidant. They can be prepared by procedures known from the state of the art.

The synthesis of the inventive compounds is shown in the following examples. Furthermore, the properties of the inventive, curable preparations, containing these compounds, especially their abhesive properties, are described. It should be appreciated that the following examples are given by way of illustration and not by way of limitation and that many changes may be effected without affecting the scope of the invention.

EXAMPLE 1

A chlorosiloxane (5.653 g) of the formula

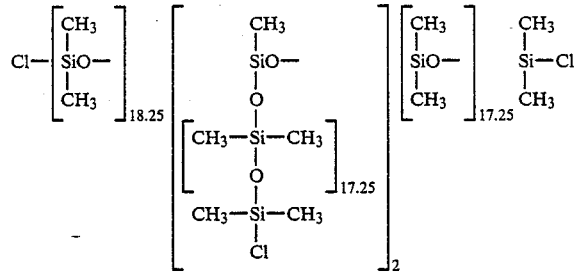

is added within 30 minutes at room temperature to 56.6 g of propargyl alcohol (1 mole+1% excess), HC≡C—CH₂OH, and 758.5 g of pentaerythritol triallyl ether (3 moles+1% excess)

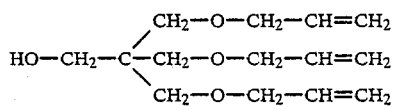

OH number = 224 dissolved in 5,000 g toluene. Stirring is subsequently continued for 30 minutes at room temperature. Gaseous ammonia is passed into the solution at a rate of about 0.3 L/minute for 3 hours. Precipitated ammonium chloride is filtered off and the filtrate is evaporated under vacuum at 100° C. A product (6,030 g) with a viscosity of 385.5 mPa× sec is obtained.

This siloxane (63.3 g) is well stirred with 10.2 g of an SiH-containing siloxane having the formula

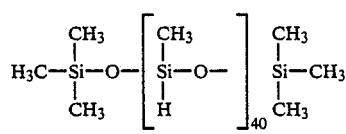

as well as with 3.39 g of a platinum complex of the formula pyridine·C₂H₄·PtCl₂. The mixture, so prepared, has a viscosity of 340 mPa×sec and a pot life of about 7 days.

EXAMPLE 2

A chlorosiloxane (5.653 g) of the formula

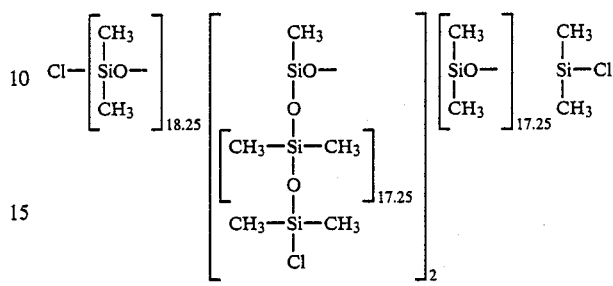

is added within 30 minutes at room temperature to 113.2 g of propargyl alcohol (2 moles+1% excess) and 432.3 g of trimethylolpropane diallyl ether (2 moles+1% excess)

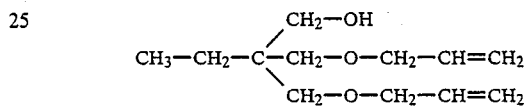

dissolved in 5,000 g of toluene. Stirring is subsequently continued for 30 minutes at room temperatures. Gaseous ammonia is passed into the solution for 3 hours at a rate of about 0.3 L/minute. Precipitated ammonium chloride is filtered off and the filtrate is evaporated under vacuum at 100° C. A product (5,685 g) with a viscosity of 344 mPa×sec is obtained.

This siloxane (60.5 g) is well stirred with 4.5 g of an SiH-containing siloxane of the formula

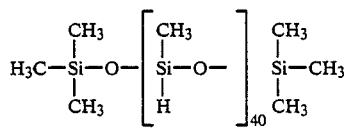

as well as 6 mg of a platinum complex of the formula pyridine·C₂H₄·PtCl₂. The mixture, so prepared, has a viscosity of 320.5 mPa×sec and a pot life of about 7 days.

EXAMPLE 3

A chlorosiloxane (5.653 g) of the formula

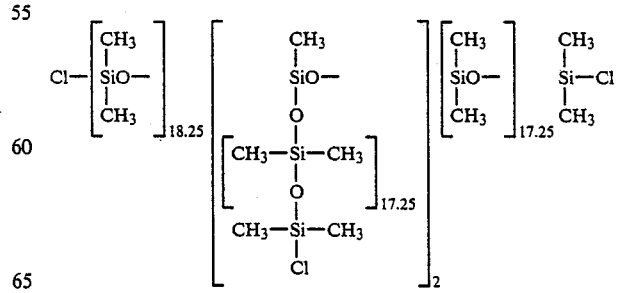

is added within 30 minutes at room temperature to 557.5 g of nonadecadiin-7-ol (2 moles+1% excess)

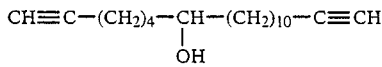

and 771.6 g of sorbitol pentaallyl ether (2 moles + 1% excess)

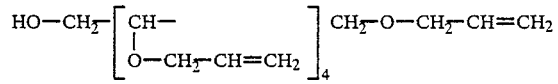

dissolved in 5,000 g of toluene. Stirring is subsequently continued for 30 minutes at room temperature. Gaseous ammonia is passed into the solution for 3 hours at a rate of about 0.3 L/minute. Precipitated ammonium chloride is filtered off and the filtrate is evaporated under vacuum at 100° C. A product (6,475 g) with a viscosity of 389 mPa×sec is obtained.

This siloxane (68.2 g) is well stirred with 11.3 g of an SiH-containing siloxane of the formula

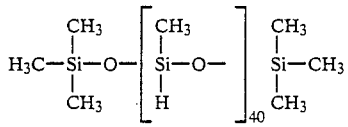

as well as with 7.3 mg of a platinum complex of the formula

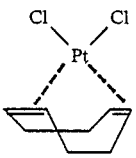

The mixture, so prepared, has a viscosity of 355 mPa×sec and a pot life of about 7 days.

EXAMPLE 4

(a) A chlorosiloxane (2,140.5 g) of the formula

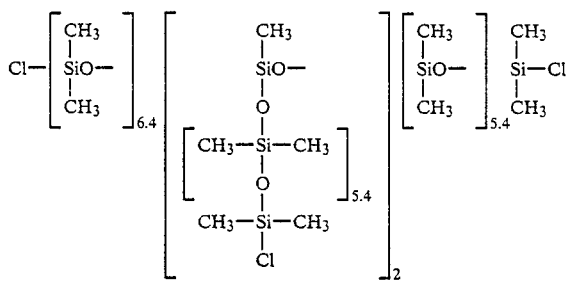

is added within 30 minutes at room temperature to 75.2 g of propargyl alcohol (1.33 moles + 1% excess) HC≡C—CH₂OH and 672.6 g of pentaerythritol triallyl ether (2.66 moles + 1% excess)

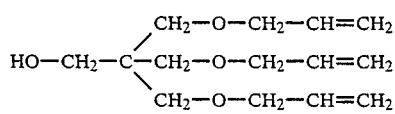

OH number = 224 dissolved in 2,000 g toluene. Stirring is subsequently continued for 30 minutes at room temperatures. Gaseous ammonia is passed into the solution for 4 hours at a rate of about 0.3 L/minute. Precipitated ammonium chloride is filtered off and the filtrate is evaporated under vacuum at 100° C. A product (2,708 g) with a viscosity of 47 mPa×sec is obtained.

(b) A chlorosiloxane (3,759.9 g) of the formula

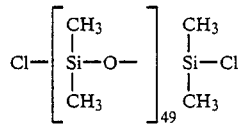

is added within 30 minutes at room temperature to 505.8 g of pentaerythritol triallylether (2 mole + 1% excess)

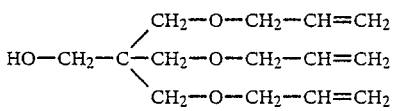

OH number = 224 dissolved in 4,000 g of toluene. Stirring is subsequently continued for 30 minutes at room temperatures. Gaseous ammonia is passed into the solution for 2 hours at a rate of about 0.3 L/minute. Precipitated ammonium chloride is filtered off and the filtrate is evaporated under vacuum at 100° C. A product (3,893.8) with an iodine number of 35.5 is obtained.

This siloxane (41.8 g) is well stirred with 6.8 g of an SiH-containing siloxane of the formula

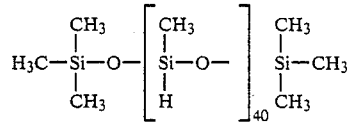

as well as 2.2 mg of a platinum complex of the formula pyridine·C₂H₄·PtCl₂ as well as with 1.2 g of the product obtained according to section a). The mixture, so prepared, has a viscosity of 72 mPa×sec and a pot life of about 7 days.

EXAMPLE 5

(a) A chlorosiloxane (3,759.9 g) of the formula

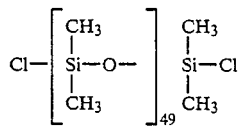

is added within 30 minutes at room temperature to 113 g of propargyl alcohol (2 moles + 1% excess) HC≡C—CH₂—OH dissolved in 4,000 g of toluene. Stirring is subsequently continued for 30 minutes at room temperatures. Gaseous ammonia is passed into the solution for 2 hours at a rate of about 0.3 L/minute. Precipitated ammonium chloride is filtered off and the filtrate is evaporated under vacuum at 100° C. A product (3,570) with a viscosity of 65.5 mPa x sec is obtained.

(b) A chlorosiloxane (3759.9 g) of the formula $$Cl-\left[\begin{array}{c}CH_3\\|\\Si-O-\\|\\CH_3\end{array}\right]_{49}\begin{array}{c}CH_3\\|\\Si-Cl\\|\\CH_3\end{array}$$

is added within 30 minutes at room temperature to 505.8 g of pentaerythritol triallylether (2 mole +1% excess)

$$HO-CH_2-C\begin{array}{c}CH_2-O-CH_2-CH=CH_2\\CH_2-O-CH_2-CH=CH_2\\CH_2-O-CH_2-CH=CH_2\end{array}$$

OH number = 224 dissolved in 4,000 g of toluene. Stirring is subsequently continued for 30 minutes at room temperatures. Gaseous ammonia is passed into the solution for 2 hours at a rate of about 0.3 L/minute. Precipitated ammonium chloride is filtered off and the filtrate is evaporated under vacuum at 100° C. A product (3,893.8) with an iodine number of 35.5 is obtained.

Siloxane (a) (37.9 g) and 41.8 g of siloxane (b) are well stirred with 6.8 g of an SiH-containing siloxane of the formula $$H_3C-\begin{array}{c}CH_3\\|\\Si-O-\\|\\CH_3\end{array}\left[\begin{array}{c}CH_3\\|\\Si-O-\\|\\H\end{array}\right]_{40}\begin{array}{c}CH_3\\|\\Si-CH_3\\|\\CH_3\end{array}$$

as well as with 3.99 mg of a platinum complex of the formula pyridine·$C_2H_4$·$PtCl_2$. The mixture, so prepared, has a viscosity of 76 mPa x sec and a pot life of about 7 days.

EXAMPLE 6

A chlorosiloxane (2,138.4 g) of the formula $$Cl-\left[\begin{array}{c}CH_3\\|\\SiO-\\|\\CH_3\end{array}\right]_{6.4}\left[\begin{array}{c}CH_3\\|\\SiO-\\|\\O\\|\\\left[\begin{array}{c}CH_3-Si-CH_3\\|\\O\end{array}\right]_{5.4}\\CH_3-Si-CH_3\\|\\Cl\end{array}\right]_2\left[\begin{array}{c}CH_3\\|\\SiO-\\|\\CH_3\end{array}\right]_{5.4}\begin{array}{c}CH_3\\|\\Si-Cl\\|\\CH_3\end{array}$$

is added within 30 minutes at room temperature to 1,010 g of pentaerythritol triallyl ether (4 moles +1% excess)

$$HO-CH_2-C\begin{array}{c}CH_2-O-CH_2-CH=CH_2\\CH_2-O-CH_2-CH=CH_2\\CH_2-O-CH_2-CH=CH_2\end{array}$$

OH number = 224 dissolved in 3,000 g of toluene. Stirring is subsequently continued for 30 minutes at room temperature. Gaseous ammonia is passed into the solution for 4 hours at the rate of about 0.3 L/minute. Precipitated ammonium chloride is filtered off and the filtrate is evaporated at 100° C. under vacuum. A product (2,782.9 g) with an iodine number of 101.0 is obtained.

This siloxane (100 g) is well stirred with 37.3 g of an SiH-containing siloxane of the formula $$H_3C-\begin{array}{c}CH_3\\|\\Si-O-\\|\\CH_3\end{array}\left[\begin{array}{c}CH_3\\|\\Si-O-\\|\\H\end{array}\right]_{40}\begin{array}{c}CH_3\\|\\Si-CH_3\\|\\CH_3\end{array}$$

as well a with 7.3 mg of a platinum complex of the formula pyridine·$C_2H_4$·$PtCl_2$. The mixture, so prepared has a viscosity of 161 mPa x sec and a pot life of 8 hours.

Testing the Application

The preparations of Examples 1 to 6 are applied with a multi-roll coater on a yellow glassine paper (60 g/m$^2$) at a rate of about 1 g/m$^2$ and cured for 20 seconds at 180° C. in a forced-air oven to tackfree coatings. The following tests were carried out.

(a) release value at 20° C. and 70° C.,
(b) residual adhesive forces
(c) abrasion resistance
(d) pot life.

(a) Determination of Release Values

Pressure sensitive adhesive tape, 3 cm wide, is rolled onto the coated paper. After heating for 24 hours at 70° C. under a load of 2 kPa (20 p/cm$^2$) and cooling to 20° C., the adhesive tape is pulled off at an angle of 180° at a rate of 1 m/minute. The force, which is required to pull the tape off, is measured and recorded in the following Table as the release value. The test is also carried out at 20° C.

(b) Determined of Residual Force

The adhesive tapes, pulled off in (a), are rolled onto a polished steel plate and subjected to a load of 2 kPa (20 p/cm$^2$) for 24 hours at 20° C. and 70° C. The adhesive strips are then pulled off by the method described for the determination of the release values. The residual adhesive force, so determined, was related to the adhesive force, which was determined in a blank experiment, in which the adhesive strip was rolled immediately onto the polished steel plate (and not onto the coated paper first). This blank value was assumed to be 100%.

(c) Abrasion Resistance

A dry finger is rubbed vigorously over the paper.

(d) Pot Life

The viscosity is observed and the processability is checked.

| | | Release Value | | Residual adhesive force | | | Abrasion |
| | Example | 20° C. | 70° C. | 20° C. [%] | 70° C. [%] | Pot life | resistance |
|---|---|---|---|---|---|---|---|
| of the | 1 | 0 | 5 | 95 | 90 | >7 days | good |
| inven- | 2 | 0 | 5 | 92 | 87 | >7 days | good |
| tion | 3 | 0 | 5 | 91 | 87 | >7 days | good |
| | 4 | 0 | 10 | 91 | 86 | >7 days | good |

-continued

| Example | Release Value 20° C. | 70° C. | Residual adhesive force 20° C. [%] | 70° C. [%] | Pot life | Abrasion resistance |
|---|---|---|---|---|---|---|
| Not of the invention 5 | 0 | 5 | 76 | 71 | >7 days | good |
| 6 | 5 | 5 | 89 | 84 | >8 hours | good |

A comparison of Examples 1 to 4, which are of the invention, with Example 5, which is not of the invention, shows that inferior residual adhesive forces are obtained when acetylenic alcohols and allyl ether polyols are not chemically linked to a polysiloxane molecule.

A comparison with Example 6, which is not of the invention, shows that the pot life is prolonged by incorporating the acetylenic alcohols in allyletherpolysiloxanes, which were known from the state of the art.

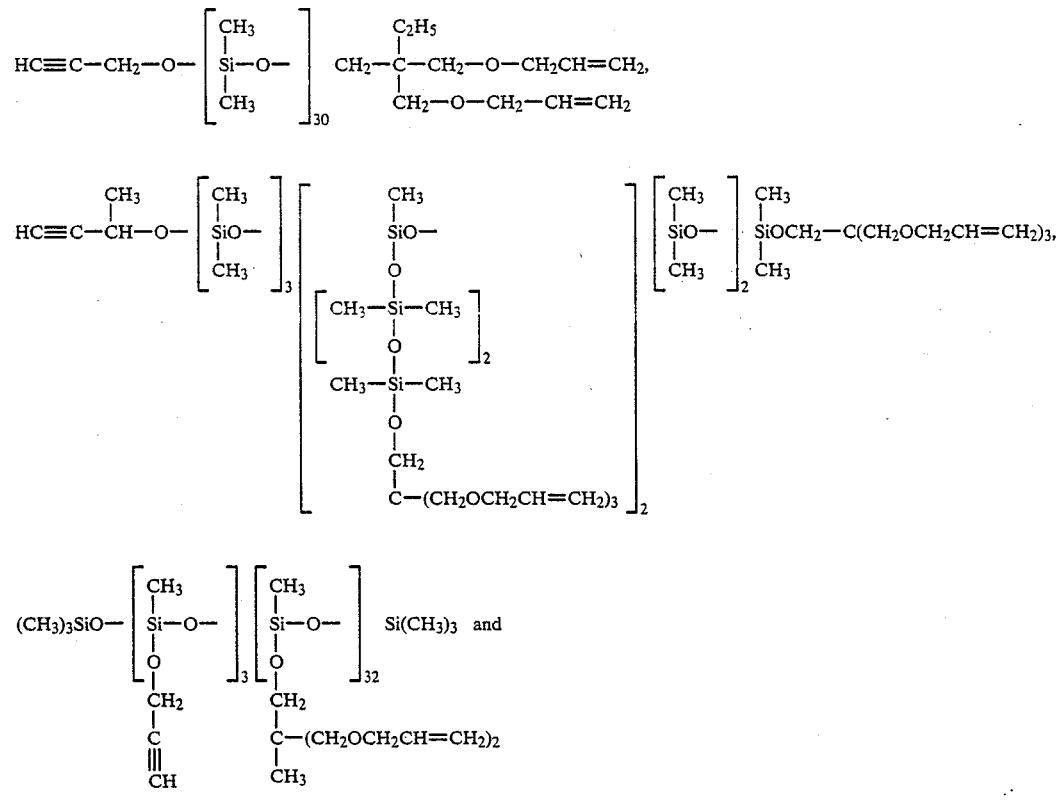

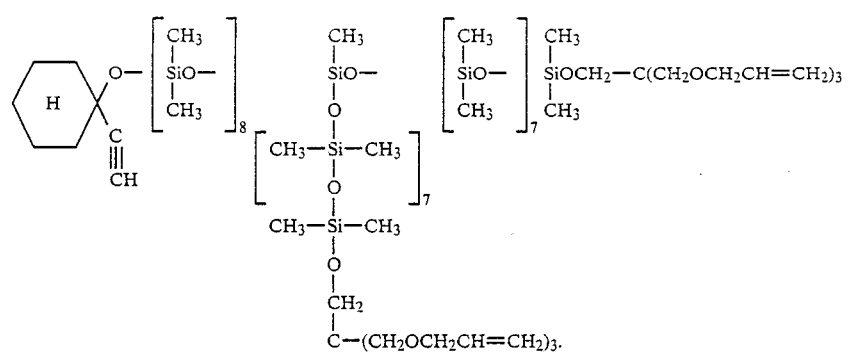

What is claimed is:

1. An organopolysiloxane comprising in the average molecule in statistical distribution (i) 1 to 24,000 units of the formula 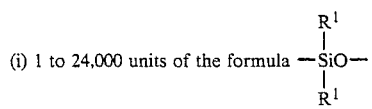

(ii) 0 to 240 units of the formula 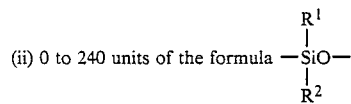

(iii) 0 to 10 units of the formula 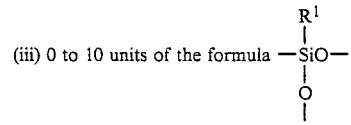

and (iv) as terminal groups, the groups $R^2$ and 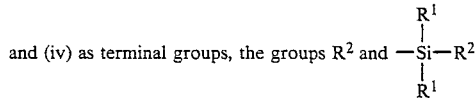

wherein $R^1$ is methyl or an admixture of at least 90% of methyl with the remainder being phenyl; and
$R^2$ is a member selected from the group consisting of
(a) $R^1$,
(b) linear or branched alkinoxy with 3 to 25 carbon atoms, and
(c) a polyalcohol with 2 to 6 hydroxyl groups from which the H-atom of the OH-groups is eliminated with all but one of the OH-groups being etherified with allyl alcohol, with the proviso that at least one —C≡C— group of said alkinyloxy is contained in the average molecule and that the numerical ratio of the —C≡C— group to the allyl etheroxy groups is 5:1 to 1:250.

2. An organopolysiloxane as claimed in claim 1, wherein (b) is a member selected from the group consisting of

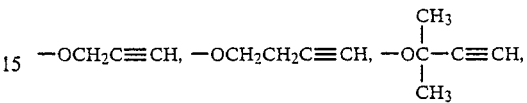

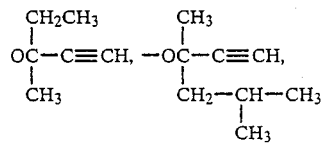

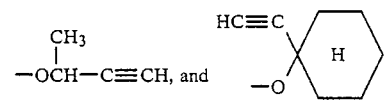

and (c) is a member selected from the group consisting of

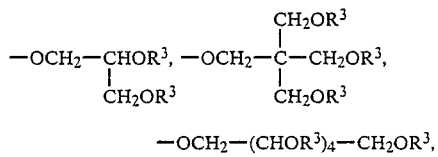

—OCH₂—(CHOR³)₄—CH₂OR³,

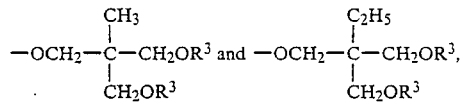

$R^3$ being an allyl group.

3. An organopolysiloxane as claimed in claim 1, having the general formula

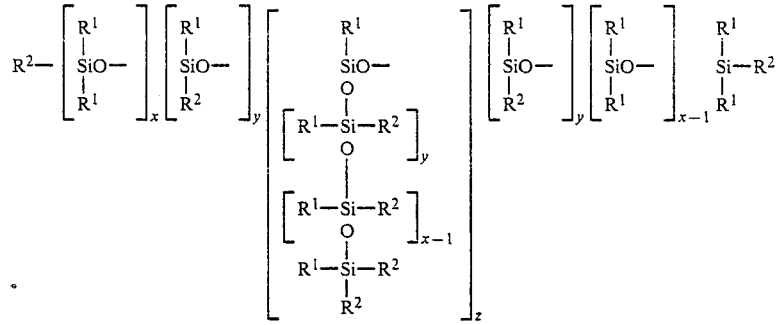

wherein
x=1 to 2000, y=0 to 20 and z=0 to 10, and $R^1$ and $R^2$ have the above meaning.

4. An organopolysiloxane as claimed in claim 3, wherein if z≧3, x is a number from 1 to 500.

5. Process for the preparation of an organopolysiloxane of the general formula

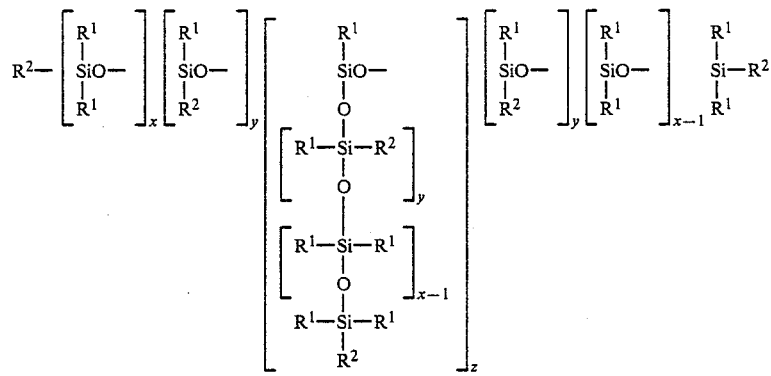

wherein
$R^1$ is methyl or an admixture of at least 90% of methyl with the remainder being phenyl; and
$R^2$ is a member selected from the group consisting of
(a) $R^1$,
(b) linear or branched alkinoxy with 3 to 25 carbon atoms, and
(c) a polyalcohol with 2 to 6 hydroxyl groups from which the H-atom of the OH-groups is eliminated with all but one of the OH-groups being etherified with allyl alcohol, $x = 1$ to 2000,
$y = 0$ to 20, and
$z = $ to 10, with the proviso that at least one —C≡C— group of said alkinyloxy is contained in the average molecule and that the numerical ratio of the —C≡C— group to the allyl ether groups is 5:1 to 1:250, which comprises reacting an organopolysiloxane of the general average formula

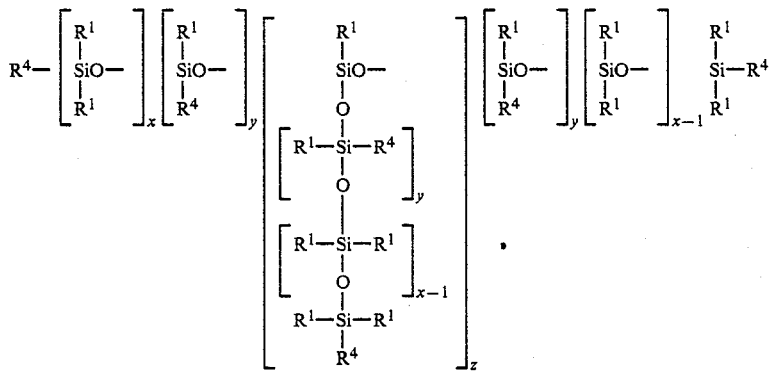

wherein $R^1$, x, y and z have the above meaning,
$R^4$ is one of
(a) alkoxy with 1 to 4 carbon atoms,
(b) halogen or
(c) hydrogen,
with a mixture of an alkinol with 3 to 25 carbon atoms and a polyalcohol with 2 to 6 hydroxyl groups, all but one of the hydroxyl groups being etherified with allyl alcohol with the proviso that the reaction is carried out with an amount of (a), (b) or (c) groups and an amount of said mixture, that the average molecule comprises at least one —C≡C— group and the numerical ratio of the —C≡C— group to the allyl ether groups is 5:1 to 1:250.

6. The process of claim 5, wherein the reaction is carried out at a temperature from 70° to 150° C.

7. Curable organopolysiloxane preparation, wherein said preparation comprises
(a) 29.9 to 98.9999 weight percent of

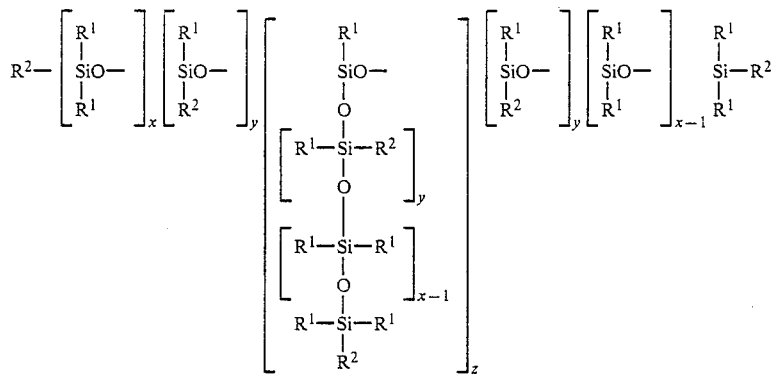

wherein
$R^1$ is methyl or an admixture of at least 90% of methyl with the remainder being phenyl; and
$R^2$ is a member selected from the group consisting of
(a) $R^1$,
(b) linear or branched alkinoxy with 3 to 25 carbon atoms, and
(c) a polyalcohol with 2 to 6 hydroxyl groups from which the H-atom of the OH-groups is eliminated, with all but one of the OH-groups being etherified with allyl alcohol, x = 1 to 2000,
y = 0 to 20, and
z = to 10, (b) 1 to 70 weight percent of an organopolysiloxane which contains in the average molecule at least 2 =SiH groups, and
(c) 0.0001 to 0.1 weight percent of a catalyst, for the addition reaction of SiH groups to carbon-carbon multiple bonds.

8. The preparation as defined in claim 7, wherein the compounds (a) and (b) are present within the specified range in such amounts, that the numerical ratio of groups with olefinic double bonds to SiH groups is about 0.6 to 2.5:1.

9. Curable organopolysiloxane preparation, wherein said preparation comprises
(a) 29.9 to 98.9999 weight percent of

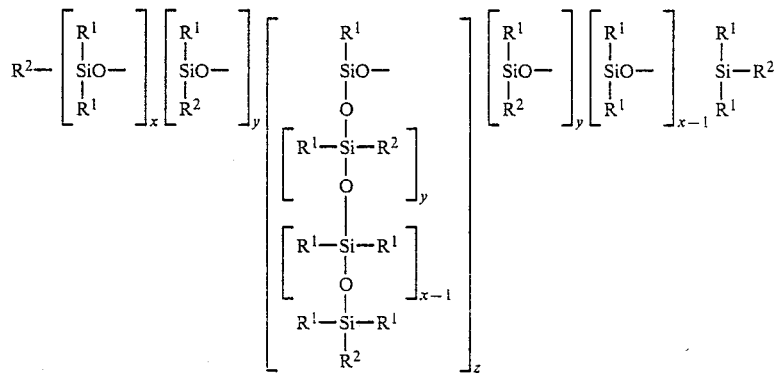

wherein
$R^1$ is methyl or an admixture of at least 90% of methyl with the remainder being phenyl; and
$R^2$ is a member selected from the group consisting of
(a) $R^1$,
(b) linear or branched alkinoxy with 3 to 25 carbon atoms, and
(c) a polyalcohol with 2 to 6 hydroxyl groups from which the H-atom of the OH-groups is eliminated with all but one of the OH-groups being etherified with allyl alcohol, x=1 to 2000, y=0 to 20, and z=0 to 10, with the proviso that up to 80 weight percent of component (a) is an organopolysiloxane of the general average formula

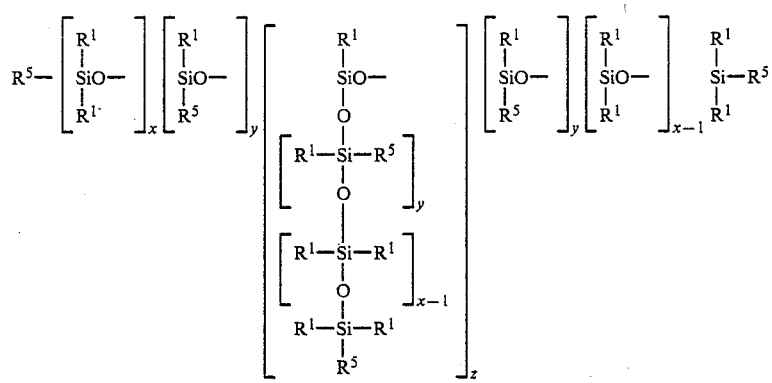

wherein
$R^1$, x, y and z have the above meaning, and
$R^5$ is a polyalcohol with 2 to 6 hydroxyl groups from which the H-atom of the OH-groups is eliminated, with all but one of the OH-groups being etherified with allyl alcohol, (b) 1 to 70 weight percent of an organopolysiloxane which contains in the average molecule at least 2≡SiH groups, and (c) 0.0001 to 0.1 weight percent of a catalyst, for the addition reaction of SiH groups to carbon-carbon multiple bonds.

10. The preparation of claim 9, wherein the ratio of the acetylenic hydrocarbon groups to the allyl groups of the organopolysiloxane (a) is 2:1 to 5:1.

11. An organopolysiloxane as defined in claim 1, selected from the group consisting of